(12) United States Patent
Paice

(10) Patent No.: US 6,982,884 B1
(45) Date of Patent: Jan. 3, 2006

(54) AUTOTRANSFORMERS TO PARALLEL AC TO DC CONVERTERS

(76) Inventor: Derek Albert Paice, 114 Rosewood Ct., Palm Harbor, FL (US) 34685

( * ) Notice: Subject to any disclaimer, the term of this patent is extended or adjusted under 35 U.S.C. 154(b) by 50 days.

(21) Appl. No.: 10/924,122

(22) Filed: Aug. 23, 2004

(51) Int. Cl.
*H02M 7/00* (2006.01)
*H02M 1/12* (2006.01)

(52) U.S. Cl. .......................... 363/44; 363/39; 363/126
(58) Field of Classification Search ................. 363/44, 363/45, 125, 126, 67, 68, 40
See application file for complete search history.

(56) References Cited

U.S. PATENT DOCUMENTS

| | | | | |
|---|---|---|---|---|
| 5,455,759 A | * | 10/1995 | Paice | 363/126 |
| 5,619,407 A | * | 4/1997 | Hammond | 363/155 |
| 5,781,428 A | * | 7/1998 | Paice | 363/126 |
| 6,011,381 A | * | 1/2000 | Andrei | 323/215 |
| 6,101,113 A | * | 8/2000 | Paice | 363/126 |
| 6,198,647 B1 | * | 3/2001 | Zhou et al. | 363/154 |
| 6,525,951 B1 | * | 2/2003 | Paice | 363/154 |

\* cited by examiner

*Primary Examiner*—Bao Q. Vu

(57) ABSTRACT

An 18-pulse converter is constructed using two, high zero-sequence impedance, phase-shifting autotransformers to parallel two 3-phase bridge converters. A third 3-phase bridge converter is directly connected to the power source. Depending on the DC filtering technique, the kVA rating of each autotransformer is 15 to 22% that of the DC load kW. The method facilitates paralleling of 3-phase bridge converters to reduce system AC line current harmonics, and is suitable for 18, 24, 36, and higher pulse numbers. The minimum number of individual autotransformers required is (n−1), where n is the number of 3-phase bridge converters. Due to the high zero-sequence impedance of the autotransformers, only a small DC load is needed to limit the DC output voltage. AC line reactance may be included in series with each converter, or in the 3-phase AC power source, to further reduce AC line current harmonics.

11 Claims, 5 Drawing Sheets

THREE, 3-PHASE BRIDGE CONVERTERS

THREE-PHASE, 4-LIMB
CONSTRUCTION TO GIVE HIGH
ZERO-SEQUENCE IMPEDANCE

AUTOTRANSFORMERS TO PARALLEL AC TO DC CONVERTERS

FIELD OF THE INVENTION

The invention relates to static AC-to DC power converters such as can be used for AC or DC motor drive systems.

BACKGROUND OF THE INVENTION

To meet industry needs for electrical power converters that convert AC to DC without injecting large amounts of harmonic currents into the power system, various patented circuit topologies are available, as described in the cited publications.

Eighteen-pulse converters have found widespread acceptance in the application of variable frequency drives, and the search for further cost reduction continues. Also, means to obtain higher pulse number converters such as 24-, 36-, and 48-pulse are sometimes required.

In some applications it is advantageous to construct a multipulse converter by paralleling multiple 3-phase bridge converters, such as are provided by a 3-phase bridge rectifier. Paralleling is relatively straightforward if a full-rating double-wound transformer is used. However, significantly lower cost can be achieved with autotransformers in conjunction with ZSBTs (zero-sequence blocking transformers). This procedure is taught in U.S. Pat. No. 6,101,113. It is desirable that the ZSBTs exhibit high magnetizing inductance so that the minimum DC load to prevent high DC output voltage is not excessive.

The autotransformer patent method described here not only eliminates the ZSBTs and reduces the amount of DC load to restrict the open circuit output voltage, but it can be applied to any multipulse configuration.

BRIEF SUMMARY OF THE INVENTION

Autotransformers with windings configured in a wye connection are arranged to provide output voltages which are of equal amplitude to the power source, and with a phase displacement of plus or minus 20° for three, 3-phase bridge converters paralleled in an 18-pulse configuration. Due to the generally 1:1 correspondence between power input voltage and voltages applied to the 3-phase bridge converters, the resulting DC output voltage under load is substantially the same as if only a single 3-phase bridge converter is connected. Thus the benefits of 18-pulse operation are obtained without changing the basic design requirements of the DC load.

To ensure proper sharing of the current in the multiple converters, means are necessary to limit circulation of triplen harmonic currents (third harmonics and multiples thereof) that would otherwise flow and prevent multipulse operation.

The invention limits circulation of triplen harmonic currents by using autotransformers with high zero-sequence impedance. High zero-sequence impedance can be achieved in wye-connected autotransformers when they are constructed in a 3-phase shell type arrangement, or with more than the three limbs typically used in standard magnetic core assemblies.

In the invention, individual 3-phase bridge converters are in general each fed by a separate, nominally 1:1, phase-shifting, high zero-sequence impedance autotransformer. However, if there are n separate 3-phase bridge converters it is feasible to use only (n−1) transformers. This may be the preferred approach in some cases, depending upon practical factors affecting current sharing. For example, an 18-pulse arrangement requires three 3-phase bridge converters, but the most favorable approach for this connection requires only two autotransformers.

Depending upon practical considerations, a 24-pulse converter would likely use four autotransformers.

If the number of autotransformers is the same as the number of 3-phase bridge converters, step-up or step-down of the AC voltages can be obtained by appropriate tappings on the transformer coils, in a manner well understood by those in the art.

The invention provides a simple, low-cost means for multiple paralleling of any number of 3-phase bridge converters, to make a multipulse AC to DC converter.

Figure 1:
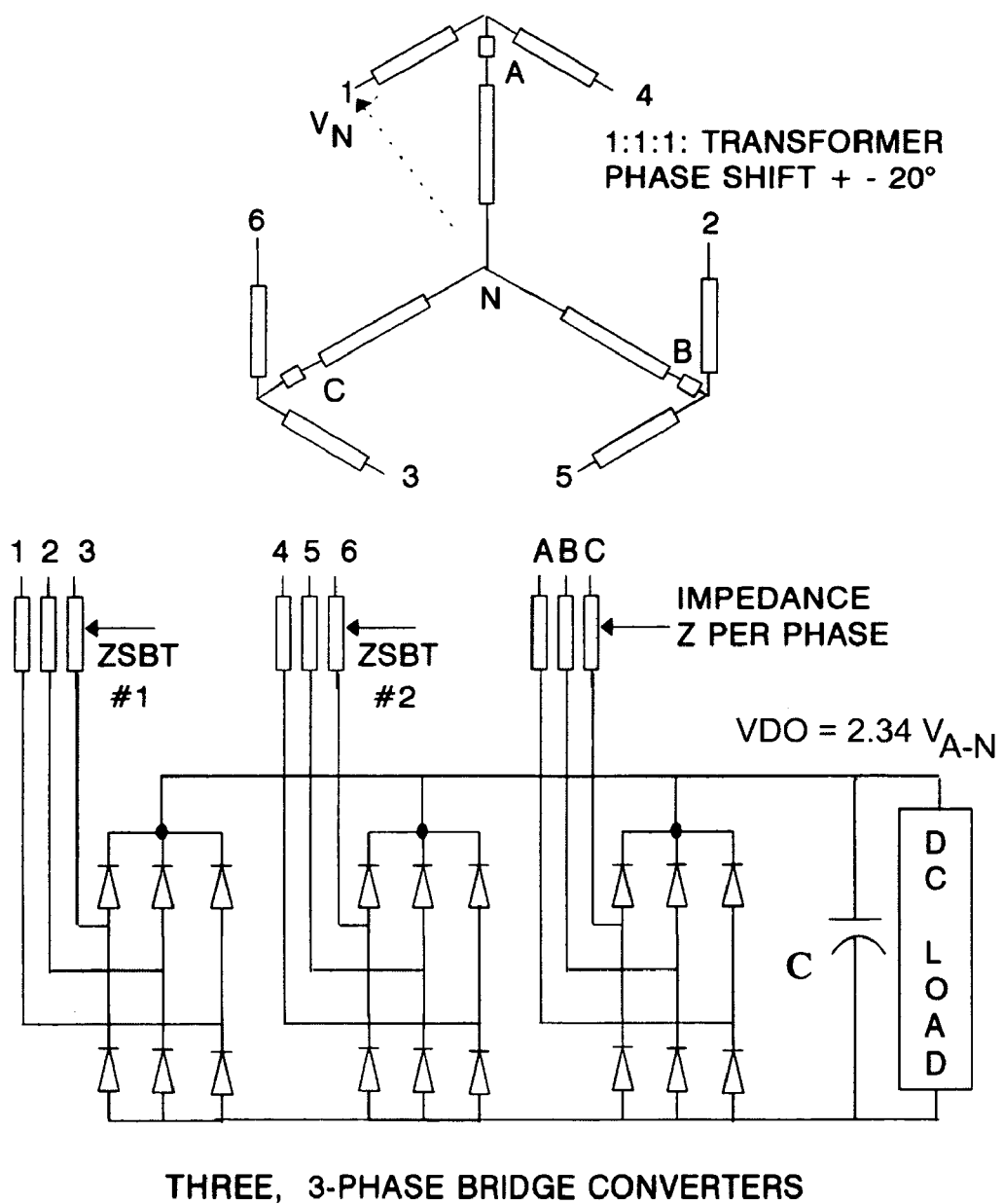
FIG. 1 shows the prior art described in U.S. Pat. No. 6,101,113 in which a single 1:1 autotransformer is used to provide dual 3-phase outputs shifted by plus and minus 20 degrees respectively. In conjunction with ZSBT#1, ZSBT#2, and three, 3-phase bridge converters, the connection shown provides an 18-pulse AC to DC converter that causes only a small amount of harmonic current to be drawn from the supply. To limit the no-load DC voltage a small amount of DC load, about 1% of the full load rating, is always connected across the DC output terminals, or an equivalent location. The nominal DC output voltage is 2.34 times the source line-to-neutral voltage $V_{A-N}$.
Figure 2:
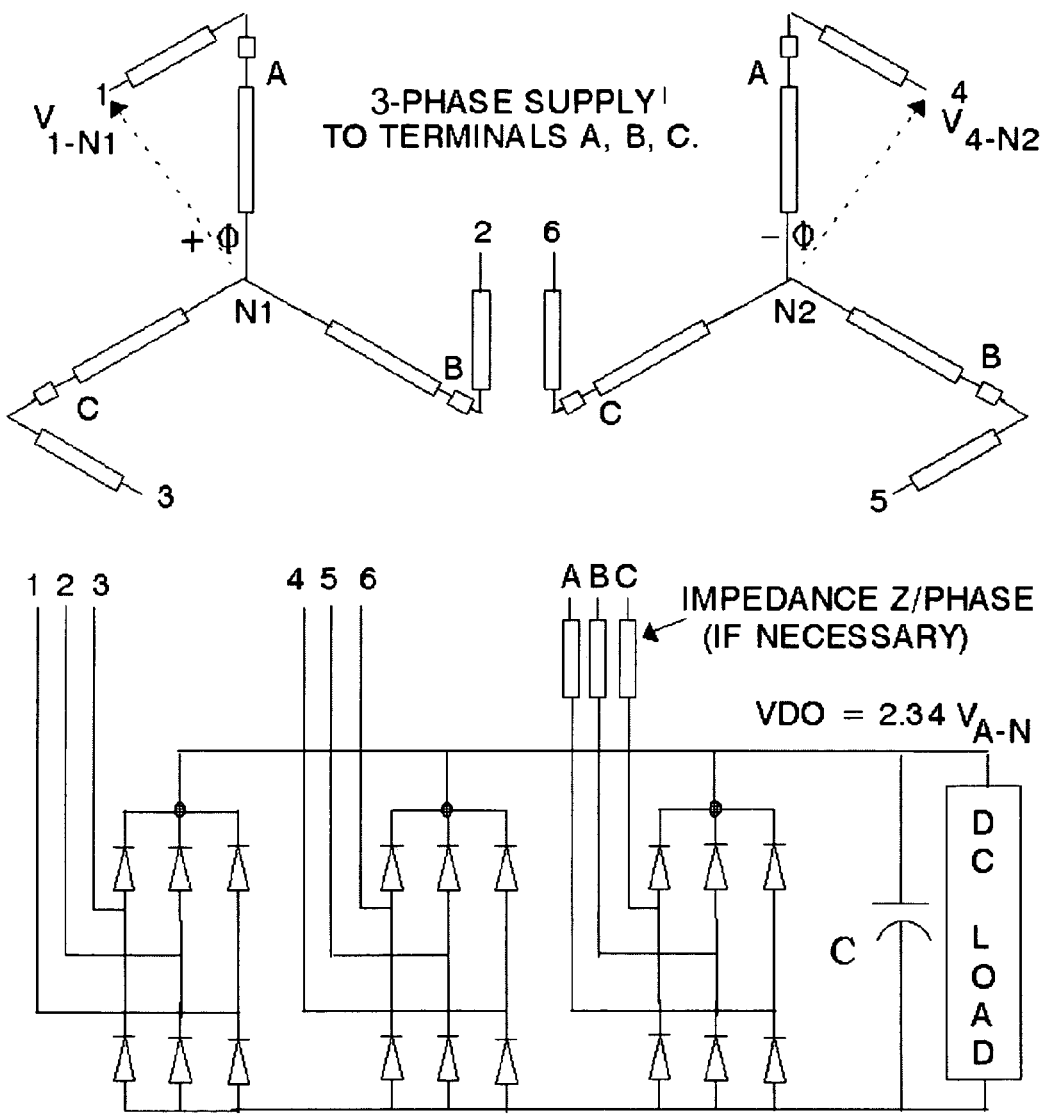
FIG. 2 shows a preferred embodiment of the invention in the case of an 18-pulse converter. Two separate 1:1 autotransformers with high zero-sequence impedance and isolated neutrals N1 and N2 respectively provide phase shifts of nominally plus and minus 20 degrees respectively to two 3-phase bridge converters. Output voltages are obtained at terminals 1, 2, 3, and 4, 5, 6, respectively. Sample voltage vectors are shown as $V_{1-N1}$ and $V_{4-N2}$ respectively. A third 3-phase bridge converter is connected directly to the source of 3-phase power available at terminals A, B, C, through an impedance Z/phase if necessary to ensure current balance. The nominal DC output voltage VDO is 2.34 $V_{A-N}$ where $V_{A-N}$ is the line to neutral voltage of the 3-phase supply. No ZSBTs are required for this connection, also, since the zero-sequence impedance of the 1:1 auto transformers is substantially greater than that of practical ZSBTs, the recommended minimum DC load is typically only 0.2% that of the full load rating.

The transformers can be manufactured identically and connected with appropriate phase rotation to give the required plus or minus phase shift. Alternatively, the transformers can be constructed with Zig windings selected from different phases as shown in FIG. 2. In this case the same phase rotation is applied to both transformers.

Figure 4:
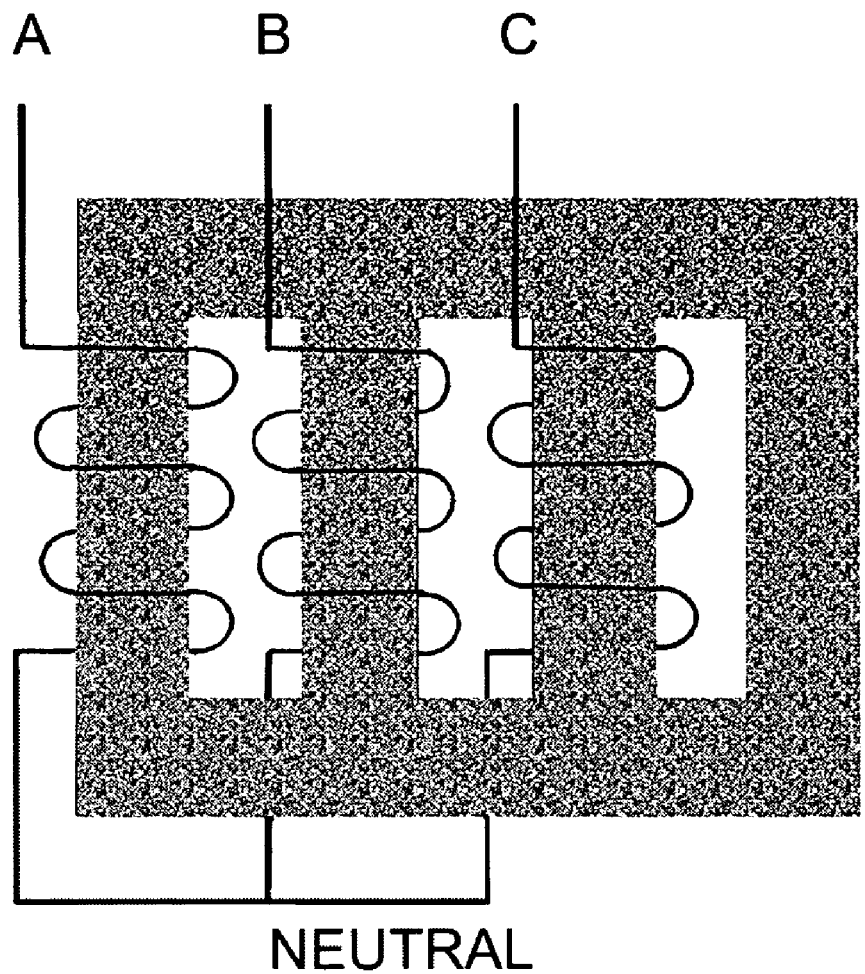

FIG. 4 shows a 4-limb core arrangement that provides a path for triplen harmonic fluxes and thereby provides a high zero-sequence impedance for the transformer invention. Other methods such as 3-phase shell, and 5-limb core designs provide high zero-sequence impedance and are known to those skilled in the art.

Figure 5:
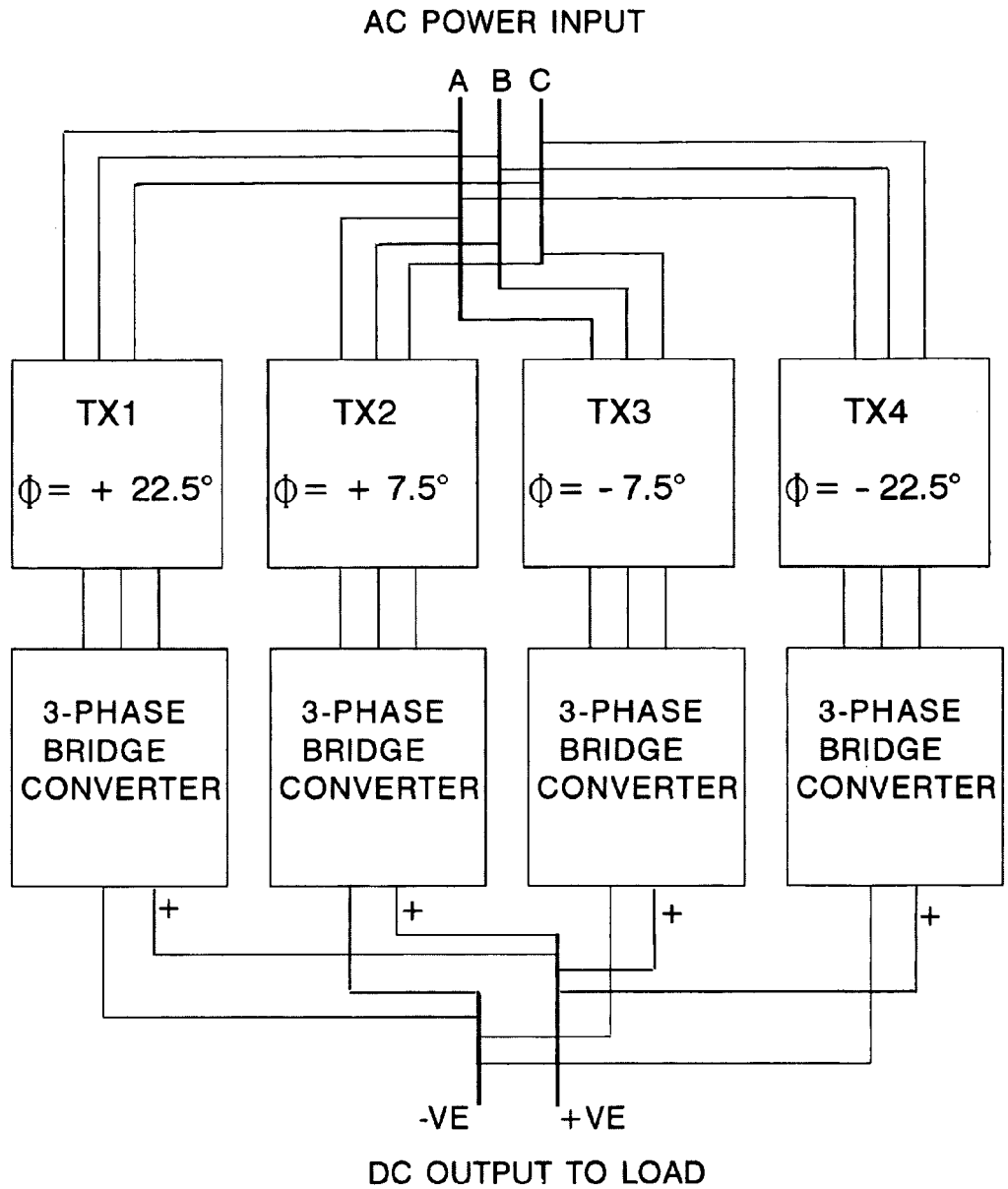

FIG. 5 shows an embodiment of the invention applied to a 24-pulse converter system. In FIG. 5 four transformers are applied to obtain excellent symmetry. However, it is also feasible to obtain the required 24-pulse performance using only three transformers with phase shifts of 30° and plus/minus 15°.

DETAILED DESCRIPTION OF THE INVENTION

The essence of this invention provides a low-cost means to parallel multiple 3-phase bridge converters in such a way that the desirable harmonic features of multipulse converters are obtained. Instead of using ZSBTs as in U.S. Pat. No. 6,101,113, the invention teaches that wye-connected autotransformers constructed to have high zero-sequence impedances will perform the same function and exhibit a higher zero-sequence impedance, resulting in lower minimum load requirements.

FIG. 2 shows the preferred embodiment of the invention connected to form an 18-pulse converter. A 3-phase power source, A, B, C, is applied to two separate, high zero-sequence impedance, phase-shifting autotransformers with associated 3-phase bridge converter loads. For 18-pulse operation the transformers provide ±20° phase shift. The supply is also connected directly, through impedance if necessary, to a third 3-phase bridge.

The output of each rectifier converter bridge is connected to a DC load with capacitor filter C. The resulting arrangement functions as an 18-pulse converter with the load shared evenly between three separate converters.

In another embodiment of the invention shown in FIG. 5, four separate autotransformers are connected to feed four converters to provide a 24-pulse arrangement.

In a further embodiment of the invention, three separate autotransformers and the power source may be connected to feed four converters to provide a 24-pulse arrangement. In this configuration two transformers provide a phase shift of ±15° and a third transformer provides a phase shift of 30°.

Other embodiments use an appropriate number of transformers as necessary. If there are n separate 3-phase bridge converters it is only essential to deploy (n−1) transformers as described above for an 18-pulse configuration.

Depending upon specific design constraints, it may be desirable in some cases to improve symmetry and current balance by using n transformers, but this is a matter for detailed practical design.

Figure 3:
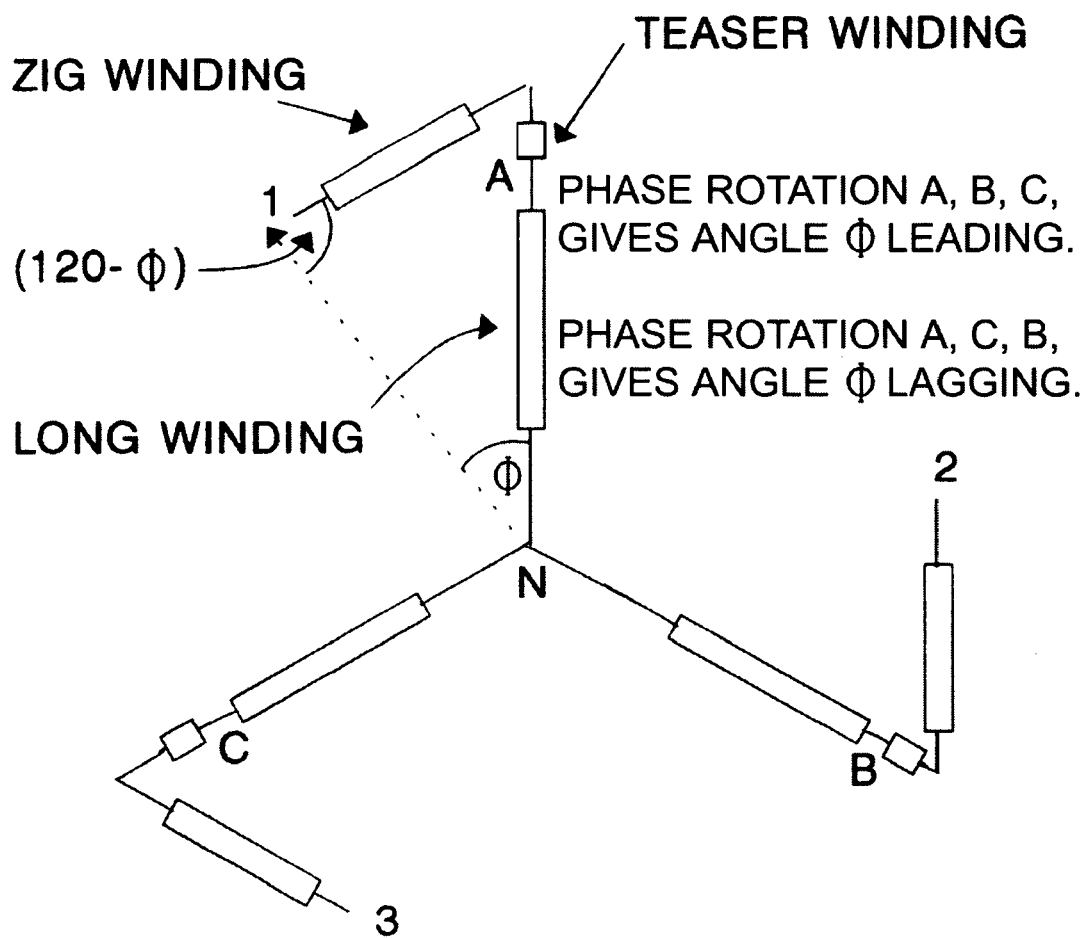
FIG. 3 illustrates the basic 1:1 autotransformer connection with neutral point N. A 3-phase AC supply is connected to terminals A, B, C, of the transformer and provides power to the LONG winding. A TEASER winding in conjunction with a ZIG winding on each phase provides a set of 3-phase output voltages at terminals 1, 2, and 3. The transformer turns are chosen to provide an output voltage nominally equal in amplitude to the input voltage and with a phase shift relative to the input voltage of Φ degrees. The angle Φ will either lag or lead the supply voltage depending upon the rotation of the power supply phasors applied to terminals A, B, C. Thus in FIG. 3 if the power supply sequence is A, B, C then Φ will be positive and lead the input voltage. If the input phase rotation is A, C, B, the angle Φ will be negative and lag the input voltage. The angle Φ is chosen so as to facilitate cancellation of harmonic currents and is such that n 3-phase bridge converters are fed with supplies shifted by generally 60°/n.

FIG. 3 indicates that the same transformer can supply either a plus or minus phase shift. If the phase shift is leading (plus φ)) for an input phase rotation of A, B. C, the phase shift will be lagging (minus Φ) if the input phase rotation is changed to A, C, B. Thus, the transformers can be manufactured identically and connected with appropriate phase rotation to give the required plus or minus phase shift. Alternatively, the transformers can be constructed slightly differently with ZIG windings selected from different phases as shown in FIG. 2. In this case, the same phase rotation of the supply is applied to both transformers. The output voltage amplitude and angle Φ is defined by the relative length of the TEASER, LONG, and ZIG windings. If the turns on the LONG winding are considered to be unity and the fractional turns on the TEASER and ZIG coils are T and Z respectively, then, assuming a 1:1 relationship between input and output voltages it can be shown that:

$$Z = \frac{2}{\sqrt{3}}\sin\Phi \text{ and } T = \left[\frac{2}{\sqrt{3}}\sin(120-\Phi) - 1\right] \quad (1)$$

What I claim as my invention is:

1. A multiple AC/DC converter system comprising multiple, 3-phase, wye-connected autotransformers with neutrals isolated from each other and constructed to exhibit high zero-sequence impedance, having three windings on each of 3 phases with two windings being connected in series to provide a tapped coil with one section of the coil being connected to form a neutral with the same coils from the other phases; with the tapping point being connected to one of the three power source lines; with the same connections on the other phases such that each of the lines of the 3-phase source are connected to the tapping point on each transformer phase; with one winding from another phase being connected to the end of the tapping furthermost from the neutral point; with the longer part of the tapped coil being called a LONG winding; with the shorter part of the tapped coil being called a TEASER winding; with the remaining coil connected to the end of the TEASER winding remote from the tapping being called a ZIG winding; with the proportionality of the turns comprising the LONG, TEASER, and ZIG windings being selected so as to achieve output voltages remote from the junction of the ZIG coil and the TEASER coil, that meets design requirements concerning amplitude and phase angle relative to the supply voltage; with such design requirements including amplitude generally equal to that of the 3-phase supply voltage and with phase angles of plus or minus generally Φ° depending upon phase rotation or connection, with respect to the supply voltage; wherein three output voltages of predetermined amplitude and phase are available from each of n or (n−1) transformers, where n is the number of 3-phase bridge converters.

2. The system of claim 1 wherein each wye connected autotransformer exhibits high zero-sequence by means of a fourth iron limb, or five iron limbs, or a shell type 3-phase design.

3. The system of claim 2 in which the three output voltages of each autotransformer are generally advanced, or generally retarded, depending upon the rotation sequence of the 3-phase AC power source.

4. The system of claim 2 in which n or (n−1) autotransformers are used to supply a quantity of n 3-phase bridge converters so as to construct a multipulse converter having line current harmonics generally of frequency (6n±1) and with amplitude relative to the fundamental current of generally 1/(6n ±1).

5. The system of claim 4 wherein AC line impedance is connected in series with each set of 3-phase output voltages.

6. The system of claim 4 whereby n or (n−1) sets of 3-phase output voltages obtained from n or (n−1) autotransformers respectively and having phase shift of generally ±60°/n are, in conjunction with a voltage set directly available from the 3-phase supply when (n−1) autotransformers are used, each connected to the center point of a separate pair of series connected semiconductor rectifying elements in which the anode of one element is connected to the cathode of another element, wherein the n cathode terminals of each pair of rectifying elements are connected together to form a positive terminal and the n anode terminals of each pair of rectifying elements are connected together to form a negative terminal.

7. The system of claim 4 whereby six transformer output voltages with phase shifts of ±20°, in conjunction with three directly available voltages from the 3-phase supply at 0° degrees, are each connected to the center point of a separate pair of series connected semiconductor rectifying elements in which the anode of one element is connected to the cathode of another element, wherein the nine cathode terminals of each pair of rectifying elements are connected together to form a positive terminal and the nine anode terminals of each pair of rectifying elements are connected together to form a negative terminal.

8. The system of claim 4 wherein a 3-phase reactor is connected in series with the 3-phase power source.

9. The system of claim 6 wherein each voltage obtained directly from the 3-phase power source is caused to pass current through an appropriate impedance to compensate for the impedance of the phase-shifting transformers; whereby a total of 3n voltages of predetermined amplitude and phase are available with three such voltages acting through a series connected impedance.

10. The system of claim 7 wherein impedance is connected in series with the 3-phase output of each autotransformer, and to the directly applied 3-phase power source, whereby nine voltages of predetermined amplitude and phase are available with nine such voltages acting through a series-connected impedance.

11. The system of claim 6 wherein impedance is connected in series with the 3-phase output of each autotransformer, and the directly connected 3-phase power source whereby 3n voltages of predetermined amplitude and phase can be applied through a series-connected impedance to n 3-phase bridge converters.

* * * * *